UNITED STATES PATENT OFFICE.

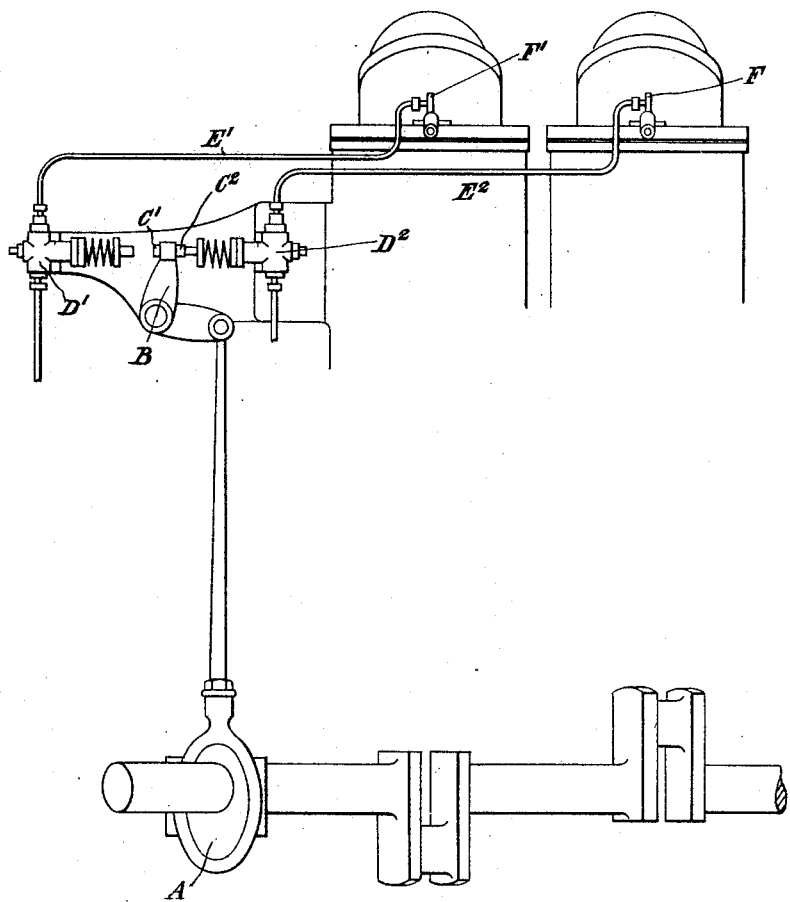

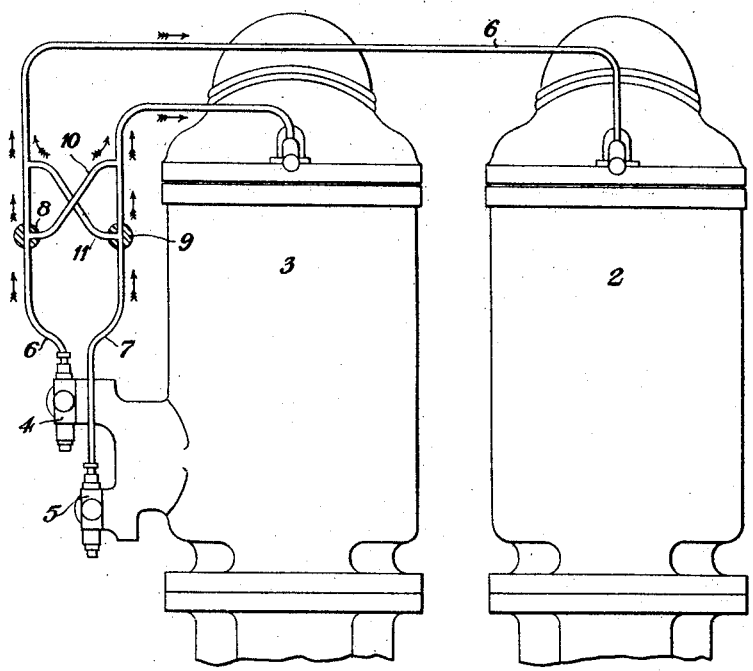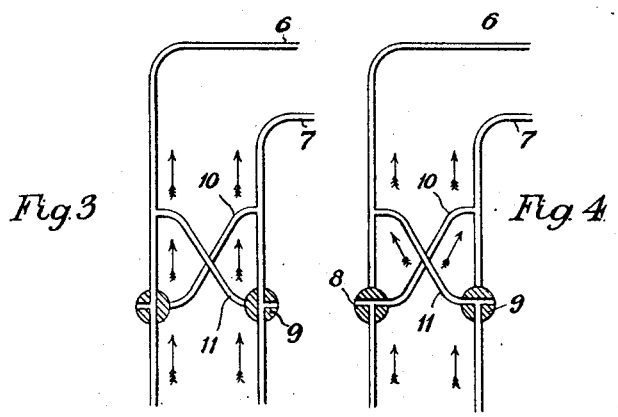

HERBERT BROOKS, OF YEOVIL, ENGLAND, ASSIGNOR TO MESSRS. PETTERS LIMITED, OF YEOVIL, ENGLAND.

MEANS FOR CONTROLLING THE SUPPLY OF LIQUID FUEL TO INTERNAL-COMBUSTION ENGINES.

1,365,301.     Specification of Letters Patent.     Patented Jan. 11, 1921.

Original application filed November 29, 1918, Serial No. 264,680. Divided and this application filed September 27, 1919. Serial No. 326,869.

*To all whom it may concern:*

Be it known that I, HERBERT BROOKS, of "Whitleigh," St. Michael's avenue, Yeovil, in the county of Somerset, England, subject of the King of Great Britain and Ireland, have invented certain new and useful Improvements in Means for Controlling the Supply of Liquid Fuel to Internal-Combustion Engines, of which the following is a specification.

This invention relates to means for controlling the supply of liquid fuel to internal combustion engines, in which the injection of fuel usually occurs when the piston is at or near the end of the compression stroke.

The object of this invention is to provide improved means for insuring complete combustion on light loads.

In internal combustion engines in which the injection of fuel usually occurs when the piston is at or near the end of the compression stroke the injection of fuel is usually made by means of fuel pump operating gear driven from the crank-shaft or camshaft of the engine and occurs at a definite moment in relation to the dead centers of the crankshaft. One of the difficulties met with in engines using liquid fuel, to obviate which several methods have been proposed, is that the ignition is uncertain or the combustion incomplete when running on light loads because the reduced amount of fuel required on light loads does not suffice to maintain, inside the combustion chamber, the temperature required for regular ignition, and for the additional reason that the time which suffices for vaporization of the fuel oil when the engine is running on heavy load is insufficient when the engine is running on light loads or without load. The result is that the speed of the engine varies, and the explosion fluctuate between misfires or very feeble explosions and excessively heavy ones.

According to this invention, I provide improved means for giving an advanced or supplementary injection of fuel into the combustion chamber, that is to say an advanced injection with or without the usual injection thereby extending the period of combustion for the purpose of obtaining and maintaining a sufficiently high temperature in the cylinder or explosion chamber, to insure complete combustion on light loads or when running without load.

In multi-cylinder engines of the type referred to each cylinder is usually provided with a separate fuel injection apparatus comprising a fuel injection nozzle for delivering fuel into the cylinder or combustion chamber, a pipe connecting the said nozzle to a fuel injection pump and operating gear driven from the engine crankshaft for operating the said fuel pump.

In the drawings filed herewith, and referred to later:—

Figure 1 is a diagrammatic view showing the essential features of the fuel injection system as heretofore applied to a two cylinder engine.

Fig. 2 is a diagrammatic plan showing my method of giving a supplementary early injection of fuel.

Fig. 3 is a diagram showing cocks arranged to give the ordinary injections;

Fig. 4 is a similar diagram to Fig. 3 showing the cocks turned to deliver the whole of the fuel passing from one pump into the next cylinder in advance in point of time of ignition of the cylinder normally supplied thereby injecting the fuel into the cylinder so supplied earlier in the cycle than the normal, and suppressing the ordinary injection.

Referring to Fig. 1, such known apparatus is illustrated as applied to a two cylinder engine but the number of cylinders is immaterial for the purpose of this description and may be more than two. According to the said figure the fuel injection apparatus consists essentially of one or more eccentrics A, rocking levers B provided with hammer faces C' and C², fuel pumps D', D², pipes E', E² and nozzles F', F².

Instead of an eccentric a cam may be used. It will be noticed that in a two cylinder engine with cranks at 180 degrees a single eccentric and rocking lever may be caused to operate two fuel pumps so as to give a fuel injection to two cylinders at the correct moments respectively in relation to the positions of the pistons.

The improved means which I employ consist in making intercommunications between the several apparatus provided as described above or as I may say crossing the apparatus. In the present invention the cross-connection is made in the fuel pipes E′, E².

In this method of carrying out the invention I may arrange a device between the fuel pumps and the injection orifices for causing the fuel delivered from the pump of one cylinder to be partly diverted to one of the other cylinders. In a two cylinder engine with cranks at 180° the phase gives an advanced injection of 180°. In a three-cylinder engine with cranks at 120°, it is possible to obtain by this method an advanced injection of either 120° or 240°. In a four-cylinder engine with cranks at right angles, it is possible to obtain advanced injections at 90°, 180°, or 270°, and so on.

I may employ whichever phase relation is best suited to my purpose having regard to the duty of the engine and the nature of the fuel used. For example, in a marine engine having 6 cylinders, I may adopt a phase relation of 120° as being more suited to a marine engine, while in a corresponding land engine having the same number of cylinders I may adopt 60°. Correspondingly, when using an oil of high ignition point, I may adopt a phase at 120° while when using a fuel of low ignition point I may adopt 60°.

Or I may, if desired, adopt two or more phase relations at the same time, to give two or more advanced or supplementary injections in the same cylinder.

In the other method for arriving at the desired result and which is applicable for use on engine having two or more cylinders in which each cylinder is supplied with fuel oil from a separate pump, I provide means for diverting the whole of the supply of fuel oil from each pump to the next cylinder, or any other cylinder in advance, in point of time of ignition, of the cylinder normally supplied by said pump thereby injecting the fuel into the cylinder so supplied earlier in the cycle than the normal. By this means, in engines of two or more cylinders, when running on light loads, the desired result is obtained without two injections.

In Fig. 2, 2 and 3 are engine cylinders adapted to be supplied with fuel from pumps 4 and 5 through pipes 6 and 7. On the pipes 6 and 7 are cocks 8 and 9 and cross pipes 10 and 11, arranged for the purpose of partly diverting the fuel from one cylinder to the other. Instead of the cocks 8 and 9 I may employ any form of valves adapted to the purpose of diverting the fuel and I may connect these cocks or valves in such a manner as to be under the control of a single operating lever, spindle or the like.

In operation the pump 5 delivers an advanced injection to the cylinder 2 and an ordinary injection to the cylinder 3, and the pump 4 delivers an advanced injection to the cylinder 3 and an ordinary injection to the cylinder 2. Although the device is shown as applied to two cylinders, it can equally well be applied to an engine having any greater number of cylinders.

With the cocks 8 and 9 set as shown in Fig. 3, each pump will deliver to the cylinder which it normally serves the ordinary injection only, and with the cocks set as in Fig. 4 the fuel delivered by each pump will be diverted from the cylinder normally served and will deliver advanced injection to the cylinder whose cycle follows in the required angular relation.

The advanced injection may be put into operation while the engine is running, either by hand or by the automatic operation of the engine governor. When the load on the engine is sufficiently heavy or constant to maintain the temperature required for complete combustion, the normal relation between each pump and its relative engine cylinder is resumed.

What I claim as my invention, and desire to secure by Letters Patent, is:—

1. In internal combustion engines of the multi-cylinder type, a plurality of fuel pumps, means for delivering an advanced injection of fuel in any number of the said cylinders by any fuel pump at a predetermined time, independently of the main injection for the purpose of obtaining and maintaining in the combustion chamber or cylinder a sufficiently high temperature and pressure to insure complete combustion on light loads.

2. In an internal combustion multi-cylinder engine in which the injection of fuel into each working cylinder usually occurs when the piston is at or near the end of the compression stroke, a pump for each cylinder adapted for the supply of liquid fuel, operating gear therefor, a delivery pipe from each fuel pump to the corresponding engine cylinder, a cross passage from each delivery pipe to that of another pump and cylinder, and means for controlling the said cross passage to enable the whole of the fuel delivered by any pump to be supplied to another cylinder of the engine at a timing in advance to that in which the normal injection is effected.

3. In an internal combustion multi-cylinder engine in which the injection of fuel into each cylinder occurs when the piston is at or near the end of the compression stroke, a fuel pump for each cylinder, operating gear therefor, a delivery pipe from each pump to the corresponding cylinder, a cross passage from each delivery pipe to that of another pump and cylinder, and means for controlling the said cross passages to enable a portion of the fuel delivered by any pump to be supplied to another cylinder of the engine independently of the main injection.

4. In an internal combustion multi-cylinder engine in which the injection of fuel into each working cylinder usually occurs when the piston is at or near the end of the compression stroke, a pump for each cylinder adapted for the supply of liquid fuel, operating gear therefor, a delivery pipe from each fuel pump to the corresponding engine cylinder, a cross passage from each delivery pipe to that of another pump and cylinder, and means for controlling the said cross passage to enable the whole of the fuel delivered by any pump to be supplied to another cylinder of the engine at a timing in advance to that in which the normal injection is effected, depending upon the angular relations of the pump operating gears to the positions of the pistons of the two cylinders of the engine in which injections are required.

5. In an internal combustion multi-cylinder engine in which the injection of fuel into each cylinder usually occurs when the piston is at or near the end of the compression stroke, a fuel pump for each cylinder, operating gear therefor, a delivery pipe from each pump to the corresponding engine cylinder, a cross passage from each delivery pipe to that of another pump and cylinder, means for controlling the said cross passages to enable a portion of the fuel delivered by any pump to be supplied to another cylinder of the engine, and means for adjusting the timing of the said delivery of fuel in accordance with the angular relations of the pump operating gears to the positions of the pistons of the two cylinders of the engine in which the injections are required, substantially as described.

6. In an internal combustion multi-cylinder engine in which the injection of fuel into each cylinder usually occurs when the piston is at or near the end of the compression stroke, a fuel pump for each cylinder, operating gear therefor, a delivery pipe from each pump to the corresponding engine cylinder, a cross passage from each delivery pipe to that of another pump and cylinder, means for controlling the said cross passages to enable a portion of the fuel delivered by any pump to be supplied to another cylinder of the engine, said means being such that, if required, they can also enable the whole of the fuel delivered by any fuel pump to be supplied to another cylinder of the engine at a timing in advance to that in which the normal injection is effected, depending upon the angular relations of the pump operating gears to the positions of the pistons of the cylinders of the engine in which injections are required.

In witness whereof I have hereunto signed my name in the presence of two subscribing witnesses.

HERBERT BROOKS.

Witnesses:
ROBERT M. SPEARPOINT,
HENRY S. BAKER.